Patented Sept. 17, 1929

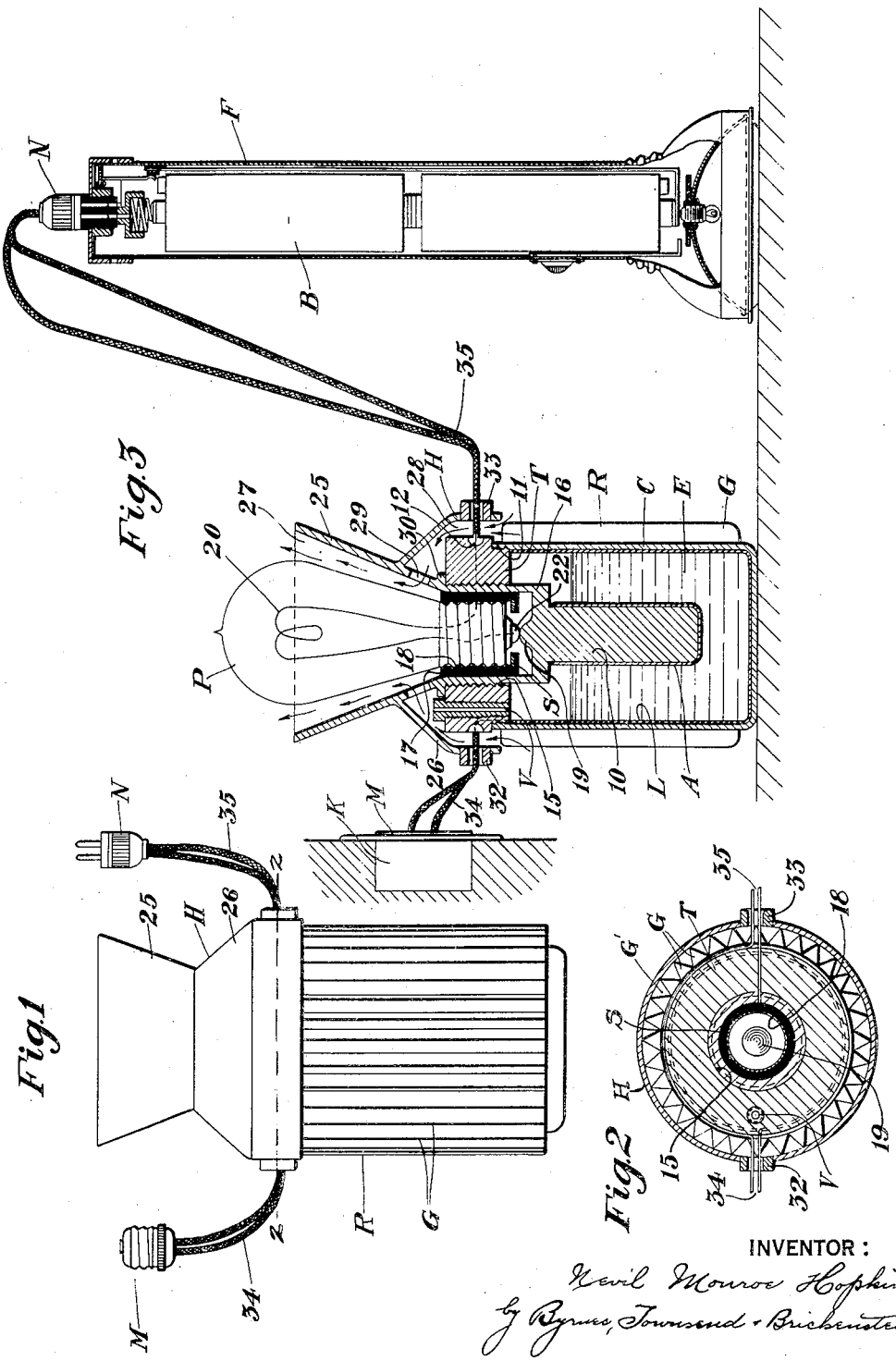

1,728,182

UNITED STATES PATENT OFFICE

NEVIL MONROE HOPKINS, OF NEW YORK, N. Y., ASSIGNOR TO THE NATIONAL CARBON COMPANY, INC., A CORPORATION OF NEW YORK

ELECTROLYTIC RECTIFIER

Application filed February 1, 1921. Serial No. 441,615.

This invention relates to electrolytic rectifiers and particularly to a portable electrolytic rectifier especially adapted for use in charging storage batteries from either direct current or alternating current relatively high-voltage distribution circuits generally found in buildings such as residences. While the invention is illustrated as applied to a portable electrolytic rectifier, it will be understood that some features thereof are of more general application and are, therefore, not limited to the particular embodiment here disclosed for purposes of illustration.

The principal object of this invention is to provide a portable type of electric current rectifier that may be coupled to either direct current or alternating current circuits and utilized for charging storage batteries from such circuits, especially miniature storage batteries such as are employed in flashlights, hand lanterns and other types of portable electric lighting devices.

Another object of this invention is to provide a compact form of electrolytic rectifier that is arranged so that suitable potential-reducing means may be mechanically and electrically coupled thereto and in circuit with the rectifying means.

A still further object of this invention is to provide against mistakes in inserting a resistance of improper voltage in circuit with the rectifier and battery and to this end the recifier is provided with a lamp socket in circuit therewith so that an electric lamp taken from the socket or receptacle into which the high-voltage terminal plug of the rectifier is inserted, may be connected in circuit with the rectifier. The lamp serves the two-fold purpose of potential-reducing means and illuminating means, and is always of the proper voltage for the electric charging circuit, allowing the passage therethrough of only the proper charging current.

Another object of the invention is to provide means for inducing a circulation of air about the rectifier and its auxiliaries to dissipate heat that is generated thereby.

The above and other objects and the novel features of this invention will be apparent from the following description taken in connection with the drawings, which constitute a part of this application and in which Fig. 1 is a side elevation of a rectifier embodying the present invention, Fig. 2 is a horizontal sectional view of the same taken on the line 2—2 of Fig. 1 looking in the direction of the arrows, and Fig. 3 is a central vertical sectional view of a rectifier embodying this invention, showing the same in use for charging miniature storage batteries of a flashlight.

Generally speaking, a rectifier embodying this invention comprises a casing C that is adapted to contain electric current rectifying means. As herein disclosed, such electric current rectifying means is of the electrolytic type consisting of suitable electrodes A and L, with a suitable electrolyte E therebetween, such electrodes and electrolyte cooperating as an asymmetric conductor to permit passage of electric current in one direction between the electrodes but not in the other. Suitable potential-reducing means may be combined with the rectifier and coupled in circuit with said electrodes, such potential-reducing means as shown, desirably consisting of an electric lamp P, the base of which fits into a lamp socket or holder S carried by the cover T of the rectifier casing, whereby the electric lamp is mechanically coupled to the rectifier casing and electrically coupled in circuit with the rectifying means. The high-potential supply terminals of the rectifier terminate in an attachment plug M of well known construction having an outer screw threaded contact and a center contact whereby said plug is adapted to fit in screw threaded lamp sockets and lamp receptacles now generally in use, and the socket S carried by the rectifier is of similar construction so that the lamp that is taken out of a socket or receptacle K, for the insertion of the attachment plug M, may be inserted in the socket S to serve both as a potential-reducing means of the proper voltage and yet continue to perform its function as an illuminating means. Of course, other types of potential-reducing means, such as resistance devices, may be coupled in circuit with the rectifier electrodes in substantially the same manner. In order to prevent an undue rise of the temperature of the rectifier and potential-reducing means, suitable heat radiating means such as fins G on the exterior of the casing C may be provided, and in addition an open ended hood H is provided on the receptacle C, partially surrounding the same and the lamp P, whereby the heat radiated by the latter will induce a circulation of air through the hood and about the rectifier casing and the lamp. The low-potential direct current terminals of the rectifier may terminate in a plug N provided with suitable pins that may be inserted in sockets or otherwise coupled to the proper terminals of a translating device, such as the storage batteries B of a flashlight.

The rectifier casing C may be of suitable material such as iron or brass and the electrode L may consist of a lining of lead in the said casing. The electrolyte E may be of any suitable composition such as borax solution; potassium sodium tartrate; disodium hydrogen phosphate and ammonium bi-chromate. The electrode A may be of suitable material such as aluminum, that will form an asymmetric conductor with the electrolyte E and electrode L and as here shown, is in the form of a hollow metal cup or thimble tightly fitting the central projection 10 that depends into the electrolyte E from the cover T.

The cover T may be provided with screw threads 11 to secure it in the upper open end of the casing C and may be provided with a circumferential groove 12 and other suitable passages to receive conductors connecting the electrodes A and L to the plugs M and N and to the contacts of the socket S. The cover also is desirably provided with a vent V for the escape of gases produced by electrolytic action in the casing C. The cover T as well as the electrode supporting projection 10 are of massive construction to assist in radiating heat generated during the rectifying action.

The cover may be provided with a central threaded opening 15 to receive the exteriorly threaded receptacle 16 in which is secured the insulating sleeve 17 that carries the screw shell socket contact 18. A suitable central contact 19 may also be provided by a projection in the bottom of the receptacle 16, the contacts 18 and 19 being disposed so that they may be engaged and electrically connected in circuit with the filament 20 of the lamp P, such filament having its terminals connected respectively to the side screw threaded contact 21 and the bottom center contact 22 on the base of the lamp. The lamp P, when screwed into the socket formed by the shell contact 18, will thus connect its side contact 21 and its bottom 22 in circuit with the socket contacts 18 and 19, respectively, and serve as potential-reducing means in series circuit with the electrodes A and L of the rectifier. The lamp P that is employed for this purpose should desirably be the one that is taken from the socket into which the high-potential plug M of the rectifier is inserted, thus insuring a resistance of the proper voltage in circuit with the electrodes of the rectifier.

The lamp P while acting as potential-reducing means, generates and radiates heat, which fact is taken advantage of to induce a circulation of air about the rectifier case and the lamp to cool the apparatus and prevent undue rise of the temperature thereof. In order to enable such heat radiation to induce a circulation of air, the lamp is at least partially enclosed by the hood H, which also partially encloses the rectifier casing C. As shown, the hood H comprises an upper bell-shaped part 25 and a lower bell-shaped part 26, the part 25 forming an air passage 27 between it and the lamp P and having an annular outlet at its upper end when the lamp is in place. The part 26 is spaced from the upper end of the rectifier case, providing an air passage 28 having an inlet at its lower end adjacent the upper ends of the fins G and the channels therebetween. The passage 28 communicates with the passage 27 through openings 29 in the lower end of the bell-shaped part 25, which may be provided with a flange 30 adapted to rest on the top side of the cover T. Thus, when the apparatus is in operation, the heat radiating from the lamp P will be confined by the bell-shaped part 25 of the hood and guided through the passage 27 upwardly, thereby inducing a circulation of air into the hood through the lower end of the part 26. As illustrated, the hood H, the receptacle 16 and the electrode support 10 may be integrally connected together or formed in one piece, as by die casting. The current of air drawn into the hood also causes an upper movement of air about the casing C and along the channels G' between the ribs G, thereby keeping down the temperature of the apparatus. The lower end of the hood member 26 may be provided with hollow bushings 32 and 33 opposite the groove 12, through which the circuit wires 34 and 35, respectively, may pass.

Other suitable potential-modifying means may be substituted for the lamp P, as for example a resistance coil, which may also be enclosed so that the heat developed therein may be employed to induce a circulation of air around the casing C. A potential-reducing transformer comprising a core and primary and secondary windings thereon may also be substituted for the lamp P. The secondary winding may be connected in circuit with the rectifier and the heating of the windings and core serving also to promote air circulation about the rectifier and through the hood H in which the transformer may be located. Furthermore, a fan driven by a miniature electric motor may also be employed, the windings of such motor being suitably connected in circuit with the electrodes A and L to serve as potential-reducing resistance in circuit therewith, and the fan arranged in the hood in such a manner as to cause a circulation of air therethrough and about the rectifier to cool the same.

The manipulation and operation of the rectifier will be understood from the drawings taken in connection with the foregoing description. Briefly, in order to charge the miniature storage batteries of a portable electric lighting device such as the flashlight F, either from direct current or alternating current circuits of say 100 to 120 volts, to obtain 2, 4 or 6 volts for charging the battery, the high-voltage connection plug M is inserted into a suitable receptacle K from which the lamp P has been withdrawn. The lamp P may then be inserted in the socket S of the rectifier. Inasmuch as the lamp that is used in the rectifier is taken from the socket, the rectifier will at once automatically adjust itself, for example, to 80 volts, 110 volts or 220 volts, as the case may be, because the proper lamp for the proper voltage is always present in the lamp socket or lamp receptacle into which the plug M is inserted. Moreover, the lamp acts as an indicator of polarity, since it will only burn brightly when the current flows in a certain direction because of the electric valve action of the electrolytic rectifier. Accordingly, this indicator action of the lamp shows when the storage battery B is charging, on either direct current or alternating current, and the lamp will only burn brightly on direct current when the delivery terminals of the plug N are properly connected to the storage battery B. The type of flashlight illustrated is one that is adapted to be supported on the lens thereof, during charging, and has socket contacts adapted to receive the terminals of the plug N, the flashlight being more fully shown, described and claimed in a copending application filed in my name. The filament 20 of the lamp heats up immediately and starts an air circulation about the apparatus before the parts of the electrolytic rectifier become unduly hot. Moreover, a part of the lamp or the filament thereof projecting above the hood H may be so exposed that the light therefrom may be utilized for illuminating purposes.

While a desirable embodiment of the invention is herein shown and described, it will be understood that the details thereof may be modified in various particulars without departing from the spirit of the invention or sacrificing any advantages thereof and therefore, the invention is not limited to the exact arrangement shown and described.

I claim:

1. A rectifier comprising the combination with a casing for containing electrolyte, of electric current rectifying means in said casing, potential changing means, and means mounted on the outer side of said casing for coupling such potential-changing means mechanically to said casing and electrically in series circuit with said rectifying means.

2. A rectifier comprising the combination with a casing having a cover and electric current rectifying means disposed within said casing, of an electric lamp socket carried by said cover having contacts in circuit with said rectifying means and adapted for coupling potential-modifying means mechanically to said casing and electrically in series circuit with said rectifying means.

3. Electrical apparatus comprising the combination of electric current rectifying means, potential modifying means, and means whereby the said potential modifying means induces a circulation of cooling medium about said rectifying means.

4. Electrical apparatus comprising the combination of electric current rectifying means, electric resistance in circuit with said rectifying means, and means whereby the heat developed by said resistance induces a circulation of air about said rectifier to reduce the temperature thereof.

5. A rectifier comprising the combination of electric current rectifying means, an electric lamp in circuit with said rectifying means, and means whereby the heat developed by said lamp induces a circulation of air about the rectifier.

6. A rectifier comprising the combination of a casing, electric current rectifying means in said casing, potential-reducing means in circuit with said rectifying means, and means partially enclosing said potential-reducing means and provided with air passages whereby a circulation of air is induced about said casing and resistance.

7. A rectifier comprising the combination of a casing, electric current rectifying means therein, potential-reducing means mounted on the casing, a hood partially enclosing said casing and said potential-reducing means and having a passage whereby the operation of said potential-reducing means induces a circulation of air through said hood and about said rectifier casing.

8. A rectifier comprising the combination with a casing, of electric current rectifying means in said casing, a hood carried by said casing having a passage open at the lower and upper ends thereof, the lower or inlet end of said passage being disposed adjacent said casing and electrical potential-reducing means in said hood in circuit with said rectifying means and operable to induce a circulation of air through said hood to reduce the temperature of said rectifier.

9. A rectifier comprising the combination of electric current rectifying means, a casing enclosing the same and having heat dissipating fins and channels between such fins, a hood carried by said casing and having an outlet and inlet, said inlet being disposed adjacent said channels, and means in said hood for inducing a circulation therethrough and along said channels to cool said rectifier.

10. A rectifier comprising the combination of electric current rectifying means, a casing enclosing the same and having exterior vertical fins with channels between said fins, a hood mounted on said casing having an outlet at its upper end and an inlet at its lower end disposed adjacent said channels, and potential-reducing means in said hood in circuit with said rectifying means and adapted to induce a circulation of air through said hood and along said channels to cool said rectifier.

11. A rectifier comprising in combination electric current rectifying means, a casing enclosing said rectifying means, a hood carried by said rectifying means and partially enclosing said casing, and an electric lamp in circuit with said rectifying means and partially enclosed by said hood whereby the heat developed thereby induces a circulation of air through said hood to cool the rectifier, a portion of said lamp being so exposed that the same may be used for illumination purposes.

12. An electrolytic rectifier comprising the combination of electrodes, an electrolyte therebetween and potential-modifying means in circuit with said electrodes, and means whereby the operation of said potential-modifying means induces a circulation of air to reduce the temperature of said electrodes and electrolyte.

13. An electrolytic rectifier comprising in combination, electrodes, an electrolyte therebetween, a casing containing said electrodes and electrolyte, and potential-changing means carried by the outside of said casing and in series circuit with said electrodes.

14. An electrolytic rectifier comprising in combination, a casing having a cover and an electrode support depending into the casing from said cover, electrodes in said casing, one of such electrodes being mounted on said support, an electrolyte in said casing, and potential-changing means carried by said cover and in circuit with said electrodes.

15. An electrolytic rectifier comprising in combination, a casing having a cover, electrodes and an electrolyte in said casing, and potential-reducing means carried by said cover in circuit with said electrodes and means whereby the operation of said potential-reducing means induces a circulation of air about said casing to cool said rectifier.

16. An electrolytic rectifier comprising the combination of a casing, suitable electrodes and an electrolyte in said casing, an electric lamp socket carried by said casing having contacts in circuit with said electrodes, and a hood carried by said casing having a part partially enclosing a portion of said casing and also having a part adapted to partially enclose an electric lamp inserted in said socket, said hood comprising two bell-shaped parts, the lower of which partially encloses the upper end of the rectifier casing and the upper of which is substantially coaxial with said lamp socket and adapted to partially enclose a lamp inserted in said lamp socket.

17. An electrolytic rectifier comprising the combination of a casing having a cover, suitable electrodes and an electrolyte in said casing, a lamp socket carried by said cover and having contacts in circuit with said electrodes, and a hood mounted on said cover and comprising a depending part partially surrounding a portion of the upper end of the casing and also having a part that is adapted to partially enclose a lamp disposed in said lamp socket and adapted to cooperate with said lamp to induce a circulation of air through the hood to prevent undue heating of the rectifier.

18. In a rectifier, the combination of a casing, electrolytic rectifying means therein, and a lamp socket carried by said casing and electrically in series circuit with said rectifying means.

19. In a rectifier, the combination of a casing comprising a cover, electrolytic rectifying means in said casing having an element carried by said cover, and a lamp socket secured to said cover and in series circuit with said rectifying means.

20. An electrolytic rectifier comprising in combination, a casing having a cover, electrodes and electrolyte in said casing, one of said electrodes being mounted on said cover, and potential-changing means carried by said cover and electrically in circuit with said electrodes.

21. An electrolytic rectifier comprising the combination of a casing having a cover, an electrolyte in said casing, electrodes in said casing cooperating with said electrolyte, one of such electrodes being carried by said cover and the other electrode constituting a lining for said casing, and means on said cover for supporting potential changing means and electrically connecting the same in circuit with such electrodes.

22. In a combined rectifier and potential modifier, the combination of casing means having a cover, holder means carried by said cover, rectifying means carried by one of such means, and potential modifying means carried by the other of such means and electrically connected in circuit with said rectifying means.

23. An electrolytic rectifier comprising the combination of a casing having a detachable cover, electrolytic rectifying means within said casing, a socket secured to said cover and having contacts in circuit with said rectifying means, and potential-modifying means coupled to said socket and in series circuit with said rectifying means.

24. A rectifier comprising a jar, electrolyte therein, a cover for said jar, an electrode carried by said jar and extending into said electrolyte, and an electrode carried by said cover and extending into said electrolyte into functioning proximity to the electrode carried by said jar.

25. A rectifier comprising a jar, electrolyte therein, a cover for said jar, an electrode carried thereby in position to extend into said electrolyte, and a resistance carried on said cover and having one terminal connected to said electrode.

26. A rectifier comprising a jar, electrolyte therein, a cover for said jar, an electrode carried by said jar and extending into said electrolyte, an electrode carried by said cover and extending into said electrolyte into functioning proximity to the electrode carried by said jar, and a resistance carried on said cover and having one terminal connected to the electrode carried by said cover.

In testimony whereof, I affix my signature.

NEVIL MONROE HOPKINS.